METHOD FOR APPLYING PHOTOGRAPHIC IMAGES OR DESIGNS TO CERAMIC OBJECTS AND IMPROVED PHOTOGRAPHIC EMULSION FOR THE PRODUCTION OF MULTI-COLOR IMAGES OR DESIGNS ON SUCH OBJECTS

Filed Jan. 25, 1965 4 Sheets-Sheet 1

FIG. 1.

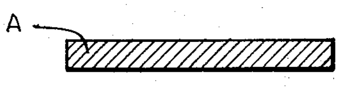

Transparent Film Base

FIG. 2.

Light Sensitive Emulsion Layer

FIG. 3.

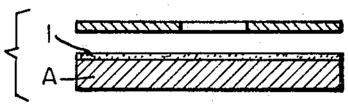

Photographic Negative

Light Exposure

FIG. 4.

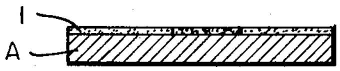

Silver Image Is Formed After Conventional Developing And Fixing Process

FIG. 5.

Silver Image Is Transformed Into Heavy Metallic Image By Chemical Process

FIG. 6.

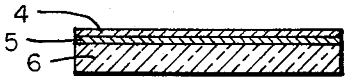

Substratum And Primed Ceramic Ware

FIG. 7.

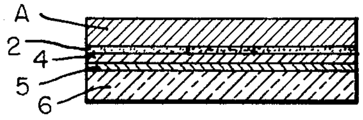

Transfer The Metallic Image On Primed Ceramic Ware

FIG. 8.

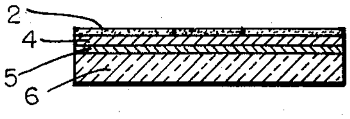

Film Base 'A' Dissolved Away By Solvents Leaves The Image Layer Adhered

FIG. 9.

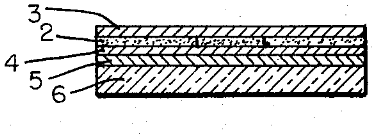

Glaze Coated On Top Of Image Layer

FIG. 10.

After Fired, The Ceramic Ware Leaves Glazed Permanent Image

INVENTOR
Charles Yu

BY Edward J. Roe
ATTORNEY

METHOD FOR APPLYING PHOTOGRAPHIC IMAGES OR DESIGNS TO CERAMIC OBJECTS AND IMPROVED PHOTOGRAPHIC EMULSION FOR THE PRODUCTION OF MULTI-COLOR IMAGES OR DESIGNS ON SUCH OBJECTS

Filed Jan. 25, 1965 4 Sheets-Sheet 2

FIG. 11.

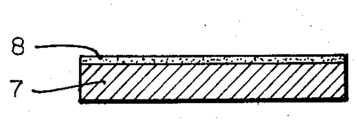

Sensitive Emulsion Containing Insoluble Ceramic Pigment

FIG. 12.

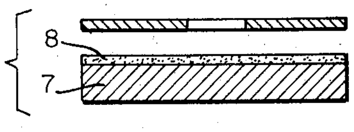

Photographic Negative Or Transparency Exposed Under Actinic Radiation

FIG. 13.

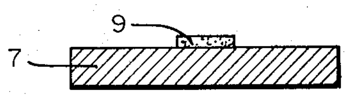

Develop In Tanning Developer To Form A Relief Image Containing Ceramic Pigment

FIG. 14.

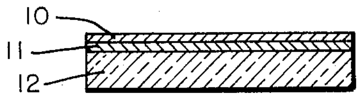

Prime And Substratum Layer Coated Ceramic Ware

FIG. 15.

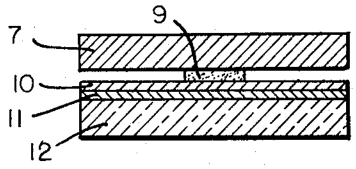

Transfer Relief Image 9 On Ceramic Ware

FIG. 16.

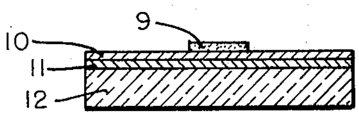

Film Base 7 Is Removed By Organic Solvents

FIG. 17.

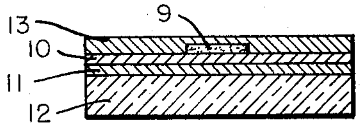

Glaze Layer 13 Is Coated On Relief Image

FIG. 18.

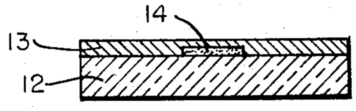

Ceramic Pigment Permanent Image

INVENTOR
Charles Yu
BY Edward G. Roe
ATTORNEY

METHOD FOR APPLYING PHOTOGRAPHIC IMAGES OR DESIGNS TO CERAMIC OBJECTS AND IMPROVED PHOTOGRAPHIC EMULSION FOR THE PRODUCTION OF MULTI-COLOR IMAGES OR DESIGNS ON SUCH OBJECTS

Filed Jan. 25, 1965 4 Sheets-Sheet 3

FIG. 19.

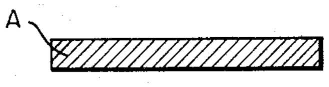

Transparent Base

FIG. 20.

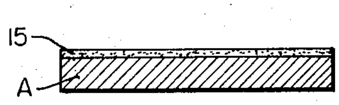

Sensitive Emulsion Incorporated With Soluble Heavy Metallic Salt Or Compound

FIG. 21.

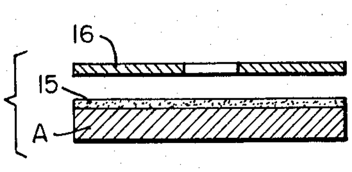

Photographic Negative Exposed Under Actinic Radiation

FIG. 22.

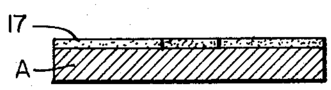

After Developing And Toning, Fix To Form Silver And Heavy Metal Complex Image

FIG. 23.

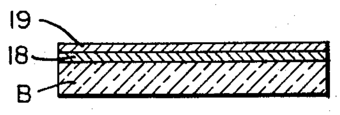

Prime And Substratum Layer Coated Ceramic Ware

FIG. 24.

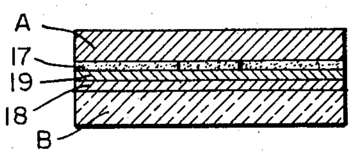

Transfer The Metallic Image On Primed Ceramic Ware

FIG. 25.

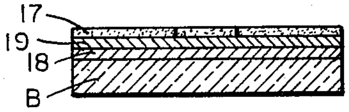

Film Base 'A' Dissolved By Solvents Leave The Layer 17 Adhered On

FIG. 26.

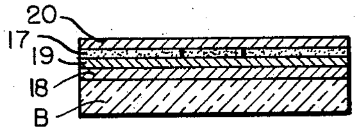

Glaze The Image Layer 17

FIG. 27.

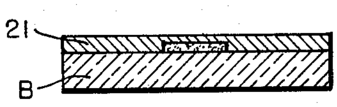

Fire The Ware, Leave Permanent Image Thereon

INVENTOR
Charles Yu
BY Edward J. Roe
ATTORNEY

Feb. 20, 1968 C. YU 3,369,894

METHOD FOR APPLYING PHOTOGRAPHIC IMAGES OR DESIGNS TO CERAMIC OBJECTS AND IMPROVED PHOTOGRAPHIC EMULSION FOR THE PRODUCTION OF MULTI-COLOR IMAGES OR DESIGNS ON SUCH OBJECTS

Filed Jan. 25, 1965 4 Sheets-Sheet 4

FIG. 28.

Sensitive Emulsion Prepared From Formula 'A'

FIG. 29.

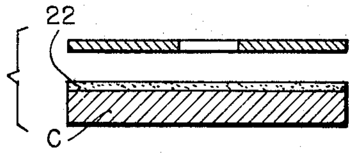

Photographic Negative

Emulsion Exposed Under Negative By Actinic Radiation

FIG. 30.

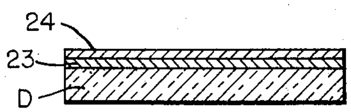

Nucleated Substratum And Primed Ceramic Ware

FIG. 31.

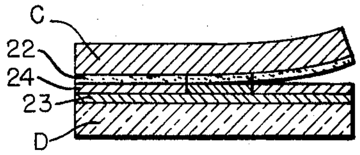

Transfer The Image With Formula 'G' Developer On To Nucleated Substratum Ware By Contact 22 And 24

FIG. 32.

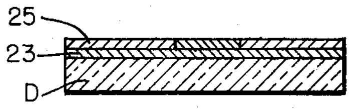

Transferred Silver Image

FIG. 33.

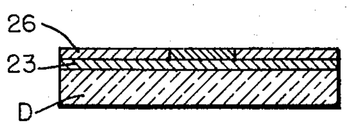

Silver Image Changed Into Heavy Metallic Image By Chemical Transformation

FIG. 34.

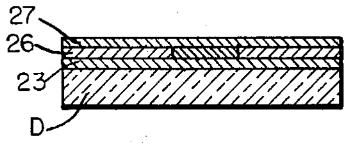

Glaze The Heavy Metallic Image

FIG. 35.

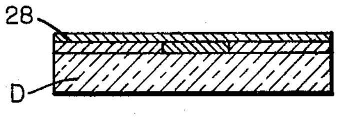

Fire The Object Leave Permanent Image 28 Thereon

INVENTOR

Charles Yu

BY Edward G. Roe

ATTORNEY 3,369,894
Patented Feb. 20, 1968

3,369,894

METHOD FOR APPLYING PHOTOGRAPHIC IMAGES OR DESIGNS TO CERAMIC OBJECTS AND IMPROVED PHOTOGRAPHIC EMULSION FOR THE PRODUCTION OF MULTI-COLOR IMAGES OR DESIGNS ON SUCH OBJECTS

Charles Yu, 45 Landing Road, Miller Place, N.Y. 11764

Continuation-in-part of application Ser. No. 828,986, July 23, 1959. This application Jan. 25, 1965, Ser. No. 427,876
14 Claims. (Cl. 96—34)

ABSTRACT OF THE DISCLOSURE

A method of producing multiple color images or designs on ceramic ware by the use of hydrophillic gelatino silver halid emulsion, drying the emulsion, exposing the sensitive material to a photographic transparency, fixing and washing to form a silver image, oxidizing the image to a silver complex compound and simultaneously depositing an insoluble ceramic color component. Variations in the basic method include directly incorporating the colorant in the silver halide emulsion in insoluble form, employing a soluble colorant in a silver halide emulsion and precipitating the same or by transferring an image to a reception layer; forming a silver halide emulsion layer which is allowed to develop and physically pressing against the nucleated substratum or reception layer and peeling off the emulsion layer.

The invention claimed herein may be briefly summarized as embodied in a new method for applying photographic images or designs to ceramic ware and an improved high speed, spectral sensitive photographic emulsion for the production of multi-color images or designs on ceramic objects such as china, pottery or porcelain and enamel. Wherever used hereinafter, the terms "ceramic biscuit" or "earthenware" is intended to mean ceramic clay bodies which have been once fired.

This application is a continuation-in-part of my copending application Ser. No. 828,986 filed July 23, 1959.

The primary object of my invention is to provide a new method for producing multiple color images or designs on ceramic ware.

Another object is the provision of an improved type of spectral sensitive, high speed photographic emulsion for the production of multi-color images or designs; this emulsion is superior to the known wet collodion emulsion, which will be referred to hereinafter.

Other objects of the invention will be in part obvious to those skilled in the art and in part appear hereinafter.

The invention briefly described comprises the use of hydrophillic gelatino silver halide emulsion and particularly spectral sensitive suitable for multi-color images or designs. The emulsion is prepared with precipitation of silver nitrate and an alkali bromide, potassium, sodium or ammonium bromide, chloride, iodide or chloro-bromide or bromo-iodide or a mixture of all in a hydrophillic colloid as protective binder such as gelatine, glue, polyvinyl alcohol, gum, water soluble polymers. The emulsion I apply to the ceramic ware can be of the neutral, acid or ammoniacal type, and the example type for formula is described hereinafter.

Prior publications such as "Ceramic Industry" issue of February 1946 have described the employement of what is known as the wet collodion process. It was first utilized as an emulsion binder for a silver sensitive system in photographic industry history but heretofore no artisan has improved the silver system by any means for its application to the ceramic industry. The disadvantages chiefly were (1) each sensitive plate must be immediately prepared by the user within a limited time after coating and completely processed while still wet; the usefulness of the coated plate is therefore seriously restricted; (2) it contains flammable highly volatile solvents which dry or evaporate rapidly when coated on ceramic ware and also uses poisonous potassium cyanide as the fixing agent; (3) due to the many complicated steps, it is difficult to control its photographic characteristics reproducibility such as speed, contrast and density.

My method and silver halide emulsion overcomes the foregoing recited disadvantages of the wet collodion process and it should be noted that my gelatino silver halide emulsion formula designed for ceramic purposes is not an obvious alternative to the art nor is it a modification of any process or method published in any prior publication.

In recent years, many types of emulsions have been developed, each of them especially designed for particular purposes. I have an example type of emulsion which is in marked difference to the wet collodion process.

In the drawings:

FIGS. 1 through 10—illustrate transfer method—Example 1.

FIGS. 11 through 18—illustrate transfer method—Example 2.

FIGS. 19 through 27—ilustrate transfer method—Example 3.

FIGS. 28 through 36—illustrate transfer method—Example 4.

EXAMPLE OF BROMIDE EMULSION (A)

(A)

| | | |
|---|---|---|
| Gelatine | gm | 42 |
| Water | ml | 300 |
| Citric acid | gm | 2.3 |

(B)

| | | |
|---|---|---|
| Silver nitrate | gm | 49.50 |
| Ammonia | | optimum amount |
| Water | ml | 54 |

(C)

| | | |
|---|---|---|
| Potassium bromide | gm | 45.45 |
| Potassium iodide | gm | 0.72 |
| Water | ml | 300 |

(D)

| | | |
|---|---|---|
| Gelatine | gm | 20 |
| Water | ml | 454 |

(E)

| | | |
|---|---|---|
| Citric acid 40% | ml | 20 |
| Water | ml | 40 |

(1) Soak gelatin A and D for 30 minutes, then dissolve at 140° F.

(2) Pour solution C to A then follow solution B.

(3) Add solution D and digest for desired speed.

(4) Pour acid solution E, chill, shred and wash.

The photo-sensitive emulsion as prepared by the above method is ready to coat, with optical sensitizing dye and regular finals, on paper or transparent flexible support to be used for transfer method.

*Transfer method—Example 1*

(1) Photographic silver halide emulsion is coated on a transparent film base A or translucent paper, as shown in FIGS. 1 and 2.

(2) After the emulsion is dried, the sensitive material is then exposed to a photographic negative or positive transparency (emulsion side face to the photographic negative), as in FIG. 3.

(3) The exposed material is processed in the conventional manner by developing, fixing and washing to form a silver image, see FIG. 4.

(4) The film or paper is then treated by chemical solutions:

Chemical solution containing soluble ceramic color compound.—To oxidize the silver image into a silver complex compound and at the same time a ceramic color component, an insoluble blue colored iron compound is deposited on the silver complex image.

EXAMPLE TYPE OF IRON TONING FORMULA (B)

| | | |
|---|---|---|
| Potassium persulfate | gm | 0.5 |
| Ferric ammonium alum | gm | 1.4 |
| Oxalic acid | gm | 3.0 |
| Potassium ferricyanide | gm | 1.0 |
| Alum | gm | 5.0 |
| Hydrochloric acid (10%) | ml | 1.0 |
| Water | ml | 1000 |

Iron atom is deposited on the silver in a ratio of 1:1. Such a process of chemically transforming a silver image into a silver complex compound, under oxidation reaction, the soluble ceramic color compound which may be precipitated in gelatine layer by the agency of the silver complex legion, is known as toning.

B–1: Chemical solution containing soluble ceramic color compound.—To oxidize the silver image into a silver complex compound and at the same time, under oxidation reaction, an insoluble nickel iron complex compound is formed and it in turn is deposited on the silver complex. Example type of nickel intensification has been disclosed in my copending application Ser. No. 828,986 filed July 23, 1959.

$$4Ag+4K_3Fe(CN)_6+6Ni(NO_3)_2 = Ag_4Fe(CN)_6+3Ni_2Fe(CN)_6+12KNO_3$$

4 molecular silver atoms are deposited 6 molecular nickel atoms, actually intensifying the silver image by 1:1½ ratio. Such a chemical transformation by intensifying the silver atoms with ceramic color component atoms in a ratio 1 to 1½ or more is known as intensification. (FIG. 5.)

B–2: Another example of intensification.—This is done by intensifying the silver image with a reactant or compound (soluble heavy metal compound) or soluble compound containing ceramic color component, so that a chemical reaction is taking place continuously resulting in an increased number of metal atoms (ceramic color component), the additional atoms being in many cases present as compounds or as a replacement of silver atom completely with another metal atom (ceramic color component):

$$2Ag+HgCl_2=2AgCl+Hg$$
$$AgHg+2HgCl_2=AgHg_3Cl_4$$

Mercuric chloride attacks silver forming silver chloride and mercurous chloride; thus each grain is increased by the addition of mercurous chloride.

In obtaining a correlation between the color of the image and the size of the grain assumed that each successive process doubled the grain size by adding an atom of mercury to each atom of silver or mercury already present in the grain. A silver image as per the above treatment is exchanged to another heavy metal such as iron, chromium, nickel, which are well known underglaze color components in the ceramic art and this metallic image layer is indicated in FIG. 5.

The gelatine film base carrying the metallic image layer #2 is next placed (with the image layer down) upon the surface of a ceramic biscuit FIG. 7 which has been previously prepared by prime coated layer #5 with a substratum gelatinous layer #4 thereon. The film image layer #2 adheres to the gelatinous layer #4 and is permitted to dry—FIG. 7. After drying, the cellulosic film base is removed by soaking with a mixture of organic solvents such as acetone, ethylene dichloride, dioxane, leaving the image layer #2 on the surface of the substratum ceramic ware as in FIG. 8.

After drying, the cellulosic flexible support can be removed by first firing operation in the kiln, leaving a colored image on the surface of the ceramic ware. A clear glaze is applied on top of the image and the ceramic ware fired for a second time—FIG. 9.

Upon the transferred image a transparent glaze (commercially called clear glaze) customarily utilized in the ceramic art, is applied and the ceramic ware fired a last time, resulting in an "underglaze" decoration with organic matter, such as gelatine, nitrocellulose, resin, and other polymers in the primer being burned and eliminated during the firing step before oxidation of the metallic image takes place. The resultant product after firing is illustrated cross-sectionally at FIG. 10 including a glazed permanent image on the ceramic ware.

*Transfer method—Example 2*

The ceramic colorant or pigment is incorporated directly to the light sensitive silver halide emulsion in insoluble form. The insoluble form of ceramic colorant or pigments employed in the emulsion for this example are those known in the art, such as iron, manganese, nickel, and heavy metal oxides.

| | | |
|---|---|---|
| Silver halide emulsion | grams | 1000 |
| Iron oxide | do | 14.4 |
| Nickel oxide | do | 22.4 |
| Optical sensitizer (1:1000) | cc | 20 |

The light sensitive silver halide emulsion thus prepared as above is ready to coat on a thin transparent cellulose acetate film when the film dries, an image or design is made from a negative by contact or projection printing, the exposure being made through the film base. After it is exposed, the film is developed in a tanning developer which hardens the gelatine to produce a relief image in tanned gelatine with response to the density of silver image.

I set forth below one example of a tanning developer (C).

A

| | | |
|---|---|---|
| Citric acid | grams | 16 |
| Pyrogallol | do | 140 |
| Ammonium bromide | do | 40 |
| Water | cc | 1000 |

B

| | | |
|---|---|---|
| Sodium hydroxide | g | 30 |
| Water | cc | 1000 |

To use, take 1 part of each to 25 parts of water. Develop 2 minutes at 68° F.

The film is thereafter placed in water at a temperature of 120° F. to 140° F. in which the unhardened gelatine portion, including the corporated powder of colorants, is washed away, leaving a colored gelatine relief image on the film, see FIG. 13.

This relief image layer is then transferred on to the surface of the ceramic ware which has been previously prime coated as at 11 FIG. 14, and covered with substratum gelatine layer 10 FIG. 14.

The substratum layer 10 acts as a binder between the gelatine relief image #3, and the priming coat 11 of the ceramic biscuit 12, since the image side is faced toward the surface of the ceramic object when positioned thereon, as depicted in FIG. 15. The colloid accomplishes the adherence of the gelatine relief image 9 to the ceramic biscuit 12 as illustrated in FIG. 15.

When dry, the film base 7 is removed in the same manner as in the first direct transfer method, namely, by application of organic solvents, the resultant product glazing being shown in FIG. 16 with the relief image 9 transferred to the ceramic biscuit 12 ready for glazing.

On top of the image 9, I apply in the conventional manner of application by brushing or spraying, a layer of clear glaze 13. The ceramic biscuit prepared is fired at the particular temperature of between 1000° F.–2800° F. which corresponds to the fusion point of the ceramic colorant, and during firing the primer burns away leaving the ceramic ware with the image 14 and glaze 13 superposed thereon—see FIG. 18.

While I have referred specifically to such ceramic colorant, as copper, chrome, iron, nickel oxides, I intend the use of others such as iron chromate, nickel ferrocyanide, etc.

*Transfer method—Example 3*

The ceramic colorant or pigment can be introduced in soluble form into the light sensitive silver halide emulsion. The addition is to be made during compounding, precipitation and a toning fixer introduced at final processing stage. The soluble heavy metallic salt or compound known as ceramic color component is incorporated in emulsion making and in a final toning fixer process. An example of this type of emulsion formula (D).

(A)

| | | |
|---|---|---|
| Gelatine | gm | 48 |
| Water (110° F.) | ml | 400 |
| Citric acid (2½ N) | ml | 5 |

(B)

| | | |
|---|---|---|
| Silver nitrate (2½ N) | ml | 20 |

(C)

| | | |
|---|---|---|
| Manganese chloride (2½ N) | ml | 22 |

(D)

| | | |
|---|---|---|
| Gelatine 6% | ml | 15 |
| Gold chloride 25% | ml | 2 |
| Ammonium thiocyanate (1.6%) | ml | 15 |

(E)

| | | |
|---|---|---|
| Lead nitrate 25% | ml | 4 |

Dissolve A at 110° F., pour solution C with constant stirring, then add solution B. Add solution D and E, respectively.

The sensitive emulsion as prepared by the formula as mentioned above is coated on a flexible support to be used for transfer process. The light sensitive material is then exposed under a negative or transparency by actinic radiation and the exposed sheet developed in a low sulfite content type of developer; thereafter the print is immersed in an acid stop bath, (1% hydrochloric acid) for one minute, washed for two minutes, and finally transferred to the fixer, (30% hypo solution containing a small proportion of ammonium thiocyanate). If intensification is desired the film can be subjected to further chemical treatment by immersing in a toning fixer, then washed thoroughly before transferring on to prime and substratum coated ceramic ware.

EXAMPLE TYPE OF TONING FIXER (E)

| | | |
|---|---|---|
| Hypo | grams | 200 |
| Alum | do | 10 |
| Citric acid | do | 1 |
| Lead nitrate | do | 1 |
| Gold chloride | do | 0.6 |
| Water | ml | 1000 |

Examples of the soluble heavy metallic salts or compounds which can be applied on this method are potassium chloroplatinite, stannous chloride, sodium telluryl tartrate, sodium selenosulfate, potassium chloropalladite, etc.

A light sensitive silver halide emulsion as compounded per the above mentioned formulation containing heavy metal soluble salt is then ready to coat on a thin transparent cellulose acetate film base A or translucent paper

15—see FIG. 20. After the emulsion is dried, the sensitive material is exposed to a photographic negative or transparency (emulsion side face to the photographic negative). The exposed material is processed in the conventional manner by developing, fixing and washing, to form a silver image. The film or paper thus coated may be given chemical solution treatment as in Example 1.

The gelatine-film base carrying the metallic image layer 17 is next placed (with the image layer down) upon the surface of a ceramic biscuit B (FIG. 24) which has been previously prepared by prime coated layer 18 with a substratum gelatinous layer 19 thereon. The film image 17 adheres to the gelatinous layer 19 and is permitted to dry—(FIG. 24). After drying, the cellulose film base is removed by soaking with a mixture of organic solvents such as acetone, ethylene dichloride, dioxane, leaving the gelatine relief image 17 on the surface of the primed ceramic ware (FIG. 25).

After drying, the cellulose flexible support can be removed by a first firing operation in a kiln, leaving a colored image on the surface of the ceramic ware. Clear glaze is then applied on top of the image 20—(FIG. 26), and the ceramic ware fired for a second time (FIG. 27).

Upon the transferred image a transparent glaze (commercially called clear glaze) customarily utilized in the ceramic art is applied and the ceramic ware fired again, resulting in an "under glaze" decoration, with organic matter, such as gelatine, nitrocellulose resin and other polymers in the primer being burned and eliminated during the firing step before oxidation of the metallic image takes place. The resultant product after firing is illustrated cross-sectionally at FIG. 27, including a glazed permanent image 21 on the ceramic ware (FIG. 27).

*Transfer method—Example 4*

A process in photography wherein a product of development of photo-sensitive silver halide emulsion, the halide ion, is utilized to produce an image by transfer to a reception layer (chemically treated substratum coated layer) with a developer containing silver halide solvent, and conversion to a visible silver image. A silver halide emulsion is coated on paper, dried and exposed to a subject 22, FIG. 29, then moistened with an alkaline solution in the presence of a silver halide developing agent, present in either alkaline solution or in the sensitive emulsion itself. Then the emulsion layer is allowed to develop and is placed in contact with the prime and neucleated substratum coated biscuit D and pressed together by means of a pressing roller. After about one minute, the emulsion layer is peeled off, the neucleated substratum coated biscuit is found to carry a positive record in developed silver of the original image 25, FIG. 32. In this photographic process for the direct production of the positive image, according to which a light sensitive silver halide emulsion layer, after being exposed to an object, is developed in the presence of a silver halide solvent, said silver halide emulsion being in close contact during said developing process with a light insensitive neucleated substratum layer containing a substance which will constitute nuclei for the photographic development process. During this process the exposed part of the silver halide emulsion layer is developed to a negative image of the object to which it had been exposed, while at the same time part of the unexposed silver halide is dissolved by the silver halide solvent. This soluble silver complex has migrated imagewise to the neucleated substratum layer or known as silver precipitating layer 24, FIG. 31, where it is reduced to a positive silver image by the silver halide solvent developer under the catalytic reaction of the nuclei for development present in said layer. The meaning of the words "negative" and "positive" is relative, meaning if the emulsion layer is exposed to a negative object, there will be produced a direct negative in the reception substratum layer, whereas if exposed to a positive object a direct positive will be obtained. As nuclei for development in the substratum layer there may be used colloidal silver, gold, silver sulfide, nickel, zinc, sodium, lead heavy metal sulfides, stannous chloride, etc. The silver precipitating agents for use in substratum layer to form a silver image include sulfides, selenides, or organic sulfides, etc. The binder for the substratum layer can be gum arabic, bum tragacanth, cellulose hydrogen phthalate, gelling carbohydrates, starch, polyvinyl alcohol, or water soluble polymers, etc.

EXAMPLE FORMULA FOR SUBSTRATUM (F)

(A)

| | Ml. |
|---|---|
| Gelatine solution 10% | 1000 |
| Water | 500 |
| Sodium sulfide (1 N) | 2.5 |

(B)

| | |
|---|---|
| Zinc nitrate (1 N) | 2.6 |
| Water | 250 |

(C)

| | |
|---|---|
| Gelatine solution 3% | 1000 |
| Saponin 8% | 30 |
| Formaldehyde 10% | 13 |

Pour solution B to A, slowly at 120° F. with stirring.

Add solution C. The preparation is ready to apply on top of the prime coated biscuit and let dry, and is then ready for image transfer 24, FIG. 30. The type of developer containing silver halide solvent to be used for this example may be sodium thiosulfate, ammonium thiocyanate, ammonia, etc.

THE TRANSFER DEVELOPER (G)

| | | |
|---|---|---|
| Water | ml. | 1000 |
| Hydroquinone | grams | 15 |
| Phenidone | do | 2 |
| Sodium sulfite | do | 30 |
| Sodium hydroxide | do | 12 |
| Sodium thiosulfate | do | 12 |
| Potassium bromide | do | 1 |

FIG. 31—

The transferred silver image 25 in FIG. 32 is subjected to chemical transformation into heavy metallic image by toning or intensification as previously stated—see 26, FIG. 33. A clear glaze 27, FIG. 34 is coated on top of the heavy metallic image 26 and then the ceramic ware fired to produce a permanent colored image layer 28 on the ceramic ware (FIG. 35).

Obviously any of the above processes may be repeated as many times as desired to apply additional colors.

I reserve the right to make such modifications or changes as may come within the scope of the appended claims.

I claim:

1. In methods applying multi-color photographic images to ceramic bodies having a porous surface, the improvements comprising means of producing multi-color permanent images or designs utilizing spectral sensitive silver halide emulsion, means of transferring said images or designs to ceramic objects and to finish said objects with the permanent images or designs thereon.

2. In methods of applying multi-color photographic images or designs to fireable clay bodies having a porous surface and provided with a prime and gelatine substratum layer for insoluble ceramic pigment layer transfer, the said emulsion layer comprising a silver halide sensitive element and insoluble ceramic pigment, including the steps of (a) forming the relief image by means of a chemical tanning developer after the said image has been in squeegee contact with the substratum layer while wet in the presence of a hardening agent
(b) allowing the film base to dry
(c) dissolving and removing the film base by organic solvent leaving the relief adhered to the substratum layer
(d) coating the surface layer with glaze
(e) firing the ceramic biscuit for a second time to finish with the image or designs permanently thereon.

3. In methods of applying photographic images or designs to ceramic objects, the process of (a) coating a spectral sensitive photographic silver halide emulsion on a thin cellulose acetate film base
(b) drying the film
(c) producing a latent image thereon under a photographic negative, transparency or design
(d) the silver image is formed by conventional photographic developing fixing process, transforming the silver image into heavy metallic image by chemical means
(e) transferring the film base, image layer down to the surface of a ceramic object which has been prime coated and substratum layered
(f) means to dissolve away the film base by organic solvent leaving the relief image on the substratum layer
(g) covering with a clear glaze, and
(h) firing at a temperature corresponding to the fusion point of the ceramic colorant, leaving the ceramic object with a permanent color image in continuous tone thereon.

4. In methods of applying photographic images or designs to ceramic objects, the process of (a) coating a spectral sensitive photographic silver halide emulsion containing insoluble ceramic pigment on a thin cellulose acetate film base
(b) drying the film
(c) producing a latent image thereon under a photographic negative, transparency or design by contact or projection printing by exposure through a film base
(d) developing in a tanning developer to produce a colored relief image on a ceramic object which is embedded with ceramic pigments
(e) transferring the film base, image layer down to the surface of a ceramic object which has been prime coated and substratum layered
(f) means to dissolve away the film base leaving the relief image on the substratum layer
(g) covering with a clear glaze, and
(h) firing at a temperature corresponding to the fusion point of the ceramic colorant, leaving the ceramic object with a permanent color image in continuous tone thereon.

5. In a method of transferring photographic images or designs to ceramic ware which has been prime coated with a substratum gelatinous layer thereon including the steps of:

(a) coating a light sensitive silver halide emulsion containing heavy metal soluble salt on a thin transparent cellulose acetate film base or translucent paper
(b) drying the emulsion
(c) exposing the light sensitive emulsion to a photographic negative
(d) processing the exposed material by developing, fixing and washing to form a silver image
(e) placing the film base carrying the metallic image layer upon the surface of the ceramic biscuit with the image layer down
(f) drying the film image adhered to the gelatinous surface layer of the ceramic biscuit
(g) removing the cellulose film base by soaking with a mixture of organic solvents leaving the gelatine relief image on the surface of the primed ceramic ware
(h) firing the ceramic ware for the first time in a kiln, leaving a colored image on the surface of the ware
(i) applying a clear glaze on top of the image (j) firing the ceramic ware for a second time whereby a glazed permanent image is produced on the ceramic ware.

6. In a method as described in claim 5 in which the organic solvents utilized in step (g) are acetone, methylene dichloride or dioxane, alcohol, ethyl acetate, Cellosolve, methyl ethyl ketone.

7. A spectral sensitive silver halide emulsion comprising soluble heavy metallic salt or compound known as ceramic pigment component which is incorporated therein during emulsification, said emulsion suitable for the production of multicolor images or designs on fireable clay bodies having a hydrophillic substratum and hydrophobic primer layer adapted for gelatine emulsion layer adhesion transfer.

8. A spectral sensitive photographic emulsion containing soluble heavy metallic salt or compound known as ceramic pigment component which is incorporated therein during emulsification, in which the developed image can be further intensified or toned by a final toning fixer, the complex heavy metallic image adapted for the production of multicolor images or designs on fireable clay bodies having a hydrophillic substratum layer provided for emulsion layer adherence thereon.

9. In a method for the production of images on ceramic ware in which a silver halide spectral sensitive emulsion is exposed to a subject with an element including a flexible support, is developed with a silver halide solvent developer to produce a silver image and the residual undeveloped silver halide caused to diffuse imagewise to a receiving substratum, and an argental image is formed in the substratum layer in the presence of a silver precipitating agent; subjecting the silver image thus formed to chemical transformation to heavy metallic image by means of toning or intensification and glazing the layer to fire to produce a permanent colored image.

10. In a photographic process for the production of images on ceramic ware according to which a spectral sensitive silver halide emulsion layer, after being exposed to the object to be reproduced, is contacted in the presence of a silver halide developing solution and a silver halide solvent with a reception substratum layer containing development nuclei, whereby a negative image is developed in the light sensitive silver halide emulsion layer and silver halide is dissolved in the unexposed areas of the silver halide layer, transferred to the reception substratum and developed nuclei to a positive image; the said image is subjected to chemical treatment transforming into heavy metallic image by means of toning or intensification, covering the metallic image with clear glaze and firing the object to produce a permanent colored image.

11. The method of applying a ceramic pigment design or image to ceramic ware including the steps of firing the design or image to its individual suitable fusion temperature, and separately firing the ceramic ware for at least one time depending upon the number of colors to be applied.

12. In a combination method of applying multicolor images or designs to ceramic ware comprising applying one color by the method of claim 2; by the application of a second color by another selected method as shown and described and firing the overlapping images simultaneously.

13. In methods of applying multicolor images or designs to ceramic ware comprising applying a first color by the method of claim 9, applying a second color by another selected method as shown and described, applying a third color by another method as shown and described, and firing the last time to form a multicolor permanent image.

14. The method of applying multicolor images or designs on ceramic ware comprising applying each color by a selected method as shown and described and firing such color individually or by applying each color separately and firing individually to form a multicolor permanent image.

References Cited

UNITED STATES PATENTS

| | | | |
|---|---|---|---|
| 3,156,562 | 11/1964 | Gladstone | 93—34 |
| 3,171,742 | 3/1965 | Yu | 96—34 |

NORMAN G. TORCHIN, *Primary Examiner.*

R. E. MARTIN, *Assistant Examiner.*